United States Patent [19]

Johnson

[11] 4,211,362

[45] Jul. 8, 1980

[54] SMOKE DETECTING TIMER CONTROLLED THERMOSTAT

[76] Inventor: Lonnie G. Johnson, 2923 N. Casitas Ave., Altadena, Calif. 91001

[21] Appl. No.: 890,825

[22] Filed: Mar. 27, 1978

[51] Int. Cl.$^2$ .......................... G05D 23/00; F24F 7/00
[52] U.S. Cl. ........................................ 236/47; 236/49; 340/630
[58] Field of Search ............................. 236/46, 47, 49; 340/630; 169/56, 60, 61

[56] References Cited

U.S. PATENT DOCUMENTS

| | | | |
|---|---|---|---|
| 2,298,757 | 10/1942 | Evans et al. | 177/311 |
| 3,884,133 | 5/1975 | Miller | 98/33 R |
| 4,049,193 | 9/1977 | Haviland et al. | 236/46 R |
| 4,058,253 | 11/1977 | Munk et al. | 236/46 R |
| 4,063,227 | 12/1977 | Peterson | 340/237 S |
| 4,110,632 | 8/1978 | Wyland | 307/117 |

Primary Examiner—William E. Wayner
Assistant Examiner—Harry Tanner

[57] ABSTRACT

A timer controlled smoke detecting thermostat has been designed. A control circuit provides for two set point temperatures and time settings for controlling the periods during which one or the other of the set-point temperatures is to be maintained. Means for detecting smoke and sounding an alarm has been built into the thermostat as well as means for inhibiting on states of a controlled heating or cooling unit to prevent air currents in the presence of smoke to reduce the speed at which fire might spread. The thermostat operates on a small leakage current flow through the heating or cooling unit. In addition to supplying power to the thermostat, this leakage current charges a battery so that when full power is applied to the heating or cooling unit and there is no leakage current, power is supplied to the thermostat by the battery. The selection of the temperature to be maintained is made time dependent through the use of an integrated-circuit clock. Temperature control is achieved by two voltage dividers each comprised of a thermistor and a variable resistor. The thermistors are detectors of ambient temperature and the variable resistors are inputs for temperature set-points. Either voltage divider can supply sufficient voltage to turn on a silicon controlled rectifier which causes full power to be applied to the heating or cooling unit. However, the integrated-circuit clock causes the application of voltage to only one of the voltage dividers at a time and, thereby, selects the set-point temperature to be maintained. Smoke is detected by causing light to be scattered onto the base detector of a photodarlington transistor located in a smoke chamber. Resulting fluctuating signals from the photodarlington are used to turn on a second silicon controlled rectifier which disables the ability of the temperature control portion of the thermostat to apply full power to the heating or cooling unit.

6 Claims, 4 Drawing Figures

SMOKE DETECTING TIMER CONTROLLED THERMOSTAT

BACKGROUND AND SUMMARY OF THE INVENTION

The availability of integrated-circuit, alarm clocks having very low voltage and current requirements has made possible the design of a solid state, timer-controlled thermostat which in the presence of smoke, sounds an alarm and inhibits the application of power to a heat exchanger under its control. It replaces conventional, bimetallic-strip thermostats with out the installation of additional wiring to satisfy power requirements and, therefore, can be installed by a person who is not a skilled electrician.

The application of power to the heat exchanger is determined by the on or off state of a silicon controlled rectifier which is controlled by supplying voltage to its gate from a voltage divider comprised of a variable resistor and a thermistor. The temperature control circuit employs two such voltage dividers. The variable resistors are temperature set-point controls and the thermistors are ambient temperature sensors. A pair of diodes facilitate independent operation of the voltage dividers by isolating the junction points supplying voltage to the gate of the silicon controlled rectifier (SCR). An integrated-circuit clock is an integral part of the thermostat. This clock controls the application of voltage to the voltage dividers. Depending on the high or low voltage state of the alarm output line of the clock, a transistor circuit applies voltage to one or the other of the voltage dividers and, thus, selects the set-point temperature to be maintained by the thermostat. By setting the clock to alarm at certain times and setting the length of time during which the alarm state is to continue, the selection of the set point temperature to be maintained is made time dependent.

A smoke detector is also an integral part of the thermostat. It disables the operation of the thermostat in the presence of smoke by turning on a second silicon controlled rectifier which removes voltage from the gate of the power control SCR. The principals upon which the smoke detector operate involve a cylindrical smoke chamber having highly reflective inner surfaces with the exception of one end which is flat black. Light from a source located inside is reflected by the inner surfaces of the chamber through out its length resulting in a high light flux density. A photodarlington transistor is mounted in the chamber. The reflected light does not normally impinge the photodarlington but smoke entering the chamber scatters some the the light onto its base detector. The light flux has direction nearly perpendicular to the face of the base detector of the photodarlingron. Its high flux density facilitates the detection of small amounts of smoke. Refracted light impinging the photodarlington causes fluctuations in current flow through it and, thereby, increases the voltage applied to the gate of the silicon controlled rectifier which disables the thermostat.

The thermostat operates on a continuous, small, leakage current-flow from the power source through the heat exchanger to which full power is controlled. A charge is maintained in a battery which supplies power to the thermostat when full power is being applied to the heat exchanger. A pulse transformer located in series with the power source uses the always present current flow through the heat exchanger to supply the 60/50 Hz syncronizing clock pulses needed by the integrated-circuit clock.

An object of the present invention is to provide a timer-controlled thermostat which can be installed by a user who is not a skilled electrician. This has been accomplished by the design of the present thermostat which uses the existing two hook-up wires operating a replaced bimetallic-strip thermostat. It is capable of controlling the full operating power of a heat exchanger. It also can control the application of some intermediate power level to a load such as a relay which, in turn, switches full power to and from the heat exchanger.

A further object of the present invention is to provide a device which sounds an alarm and cuts off a heating or cooling unit in case of smoke. The resulting loss of air currents is intended to slow the rate at which a possibly present fire might spread.

DETAILED DESCRIPTION AND PREFERRED EMBODIMENT OF THE INVENTION

Figure 1:
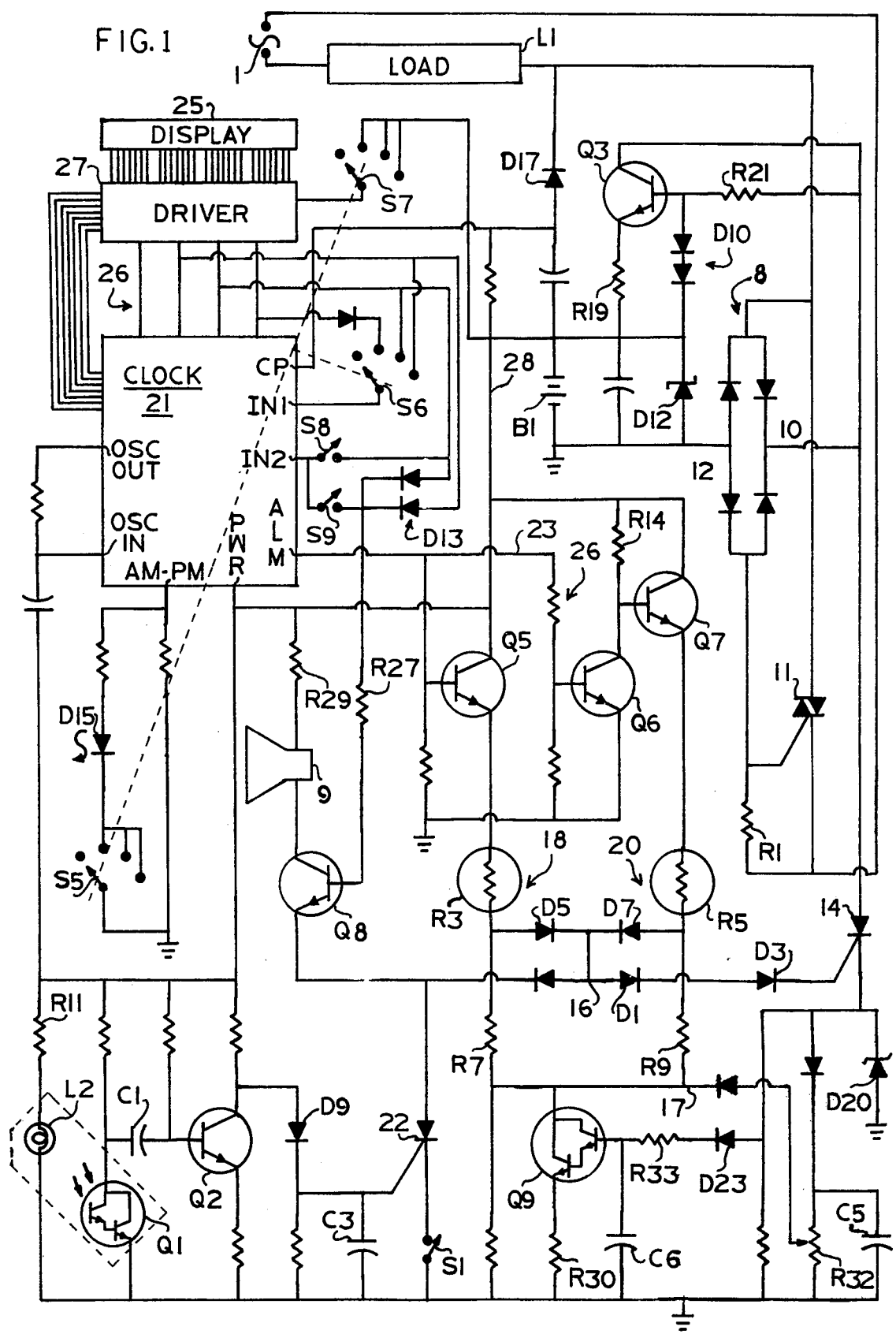
FIG. 1 is a schematic diagram of a thermostat representative of the present invention. The circuit shown includes a temperature control circuit, a timing circuit, a power supply circuit and a smoke detector.

An in-depth understanding of the present invention can be derived from the following description with reference to the drawings. The thermostat shown in FIG. 1 includes a temperature control circuit, a timing circuit, a power supply circuit and a smoke detector. The description will begin with the temperature control circuit. Referring to the locations showing alternating current (AC) power source 1, load L1, triac 11 and full-wave rectifier bridge 8, turning on triac 11 applies full power to load L1. This is accomplished by increasing the voltage drop across resistor R1. A voltage insufficient to turn on triac 11 is normally present across resistor R1 due to a small current flow across direct current terminals 10 and 12 of rectifier 8. This small leakage current flow powers the remaining circuits of the thermostat. Silicon-controlled rectifier (SCR) 14 facilitates the current flow increase needed to initiate an on state of triac 11.

Temperature sensing and power control is provided by SCR 14, diodes D1, D3, D5, and D7, thermistors R3 and R5, and variable resistors R7 and R9. SCR 14 turns on when the voltage at junction 16 is sufficient to forward bias its gatecathode junction and diodes D1 and D3. Diode D5 or D7 supplies voltage to junction 16 from voltage divider 18 or 20 respectively. Voltage is applied to only one voltage divider at a time. Diodes D5 and D7 prevent the resistances of one voltage divider from affecting the voltage applied to junction 16 by the other. The resistance ratio of thermistor R3 or R5 and variable resistor R7 or R9 respectively, of the voltage divider to which voltage is applied determines the voltage at junction 16. Since the resistance of thermistors R3 and R5 depend on ambient temperature, variable resistors R7 and R9 function as temperature set point controls for turning on SCR 14.

Variable resistors R30 and R32 control the duty cycle of the thermostat. They determine the temperature change to be brought about with each on-off cycle of load L1 and the rate at which the cycles occur. When an on state of SCR 14 is initiated, it must be reinitiated with each direct current (DC) half-wave appearing across terminals 10 and 12 of rectifier 8 to make the application of power to load L1 continuous. Capacitor C5 insures that these repeated on states occur. It and variable resistor R32 control the amount of change which must be made in the resistance ratio of the thermistor and variable resistor of a given voltage divider before SCR 14 is returned to a sustained off state. This voltage divider is the one currently supplying turn on voltage to the gate of SCR 14. Capacitor C5 charges with each DC half wave passing through SCR 14 and discharges through variable resistor R32, and thereby increases the voltage at common junction 17 of voltage dividers 18 and 20. This increases the voltage at junction 16 above that which originally initiated the series of on states of SCR 14. The ratio of the resistances in the voltage divider supplying turn on voltage to junction 16 will eventually change, assumed due to sensed ambient temperature change, sufficiently to negate the effect of capacitor C5 and return SCR 14 to a sustained off state. Resistor R32 determines the voltage supplied to common junction 17 from capacitor C5 and thereby controls the magnitude of change required to negate its effect. The effect of capacitor C5 is also influenced by current flow at the collector of darlington transistor Q9. The voltage which appears across zener diode D20 with the repeated on states of SCR 14 is coupled by resistor R33 and diode D23 to the base of darlington transistor Q9 where it charges capacitor C6. Transistor Q9 negates the voltage increase at junction 17 produced by capacitor C5. Zener diode D20 regulates the voltage supplied to the duty cycle control circuit to inhibit variations in the duty cycle with different voltages of AC power source 1 and levels of current flow through load L1.

The overall rate at which the effect of capacitor C5 is cancelled is determined by variable resistor R30 in addition to changes in the resistance ratio of the voltage divider currently supplying voltage to junction 16. The voltage across capacitor C6 determines the voltage across resistor R30 because of the emitter follower configuration in which transistor Q9 is used. The magnitude of current flow through transistor Q9 is proportional to the voltage across resistor R30 and, therefore, to the magnitude of charge on capacitor C6. Eventually the charge being accumulated in capacitor C6 will have sufficient voltage to cause enough current flow through transistor Q9 to decrease the voltage at junction 16 to a value where SCR 14 is returned to a sustained off state. At this point the voltage at junction 16 will drop to an even lower value. This voltage drop occurs because the effect of capacitor C5, which was to return SCR 14 to an on state in spite of increases in current flow through transistor Q9, has been removed from the circuit due to an absence of voltage across diode D20. If no change in ambient temperature has been sensed, the circuit will return to the conditions which existed at the initiation of the sequence of on states of SCR 14 after the charge accumulated in capacitor C6 has been dissipated and transistor Q9 is turned off. Because of the presence of diode D23, the only path for the discharge of capacitor C6 is through the base of transistor Q9. The delay in return to the original operating state is intended to allow sufficient time for detection of the temperature change brought about by the previous on state of load L1.

The cycle time required to charge capacitor C6 sufficiently to turn SCR 14 off and dissipate the charge to return transistor Q9 to an off state is determined by the resistance of variable resistor R30. The function of variable resistor R30 is best understood if one assumes that a sequence of on states of SCR 14 has been initiated and some fixed magnitude of current flow through transistor Q9 is required to turn it off. If the resistance of variable resistor R30 is large, a high voltage on capacitor C6 and an associated long time period are required to establish the current flow needed to turn SCR 14 off. Similarly, when SCR 14 is finally turned off, the time required to return transistor Q9 to an off state is long because of the large resistance of resistor R30 and the large charge on capacitor C6. On the other hand, if the resistance of resistor R30 is small, then a low voltage on capacitor C6 and, therefore, a short accumulation time period are required to establish the current flow needed to turn SCR 14 off. Likewise, after SCR 14 has been turned off, the time required to turn transistor Q9 off is short because of the small resistance of resistor R30 and the small charge on capacitor C6. For both of these cases, the time required for capacitor C5 to dissipate its charge after SCR 14 has been turned off is very short and does not influence the discharge rate of capacitor C6.

For more detailed information on the effect of capacitor C5 on the on-off cycles of SCR 14 refer to patent application Ser. No. 839,631 entitled, *Variable Resistance Type Sensor Controlled Switch*. The application was filed by the present inventor, Lonnie G. Johnson, on Oct. 5, 1977. The duty cycle control circuit disclosed in that application did not use darlingron transistor Q9 and incorporated only one set-point control.

A timing circuit selects the temperature to be maintained by the thermostat. The application of voltage to one or the other of voltage dividers 18 and 20 is made time dependent by integrated-circuit clock 21. Clocks of this type are state-of-the-art devices and are commercially available. The primary specifications for the type of clock used are that it must have low current and voltage requirements, and it must have an output line which assumes a high voltage state at some preselected time and remains in the high state for some preselected period of time. Clock 21 is of a type generally used in clock radios. Radio alarm output line 23 meets the above specifications. Switch S6, shown connected to the IN1 input of clock 21, has four positions and is a typical requirement for this type of clock. The four positions of switch S6 are: run, set time of day, set time of day at which output line 23 is to assume a high voltage state, and set length of the time period during which output line 23 is to remain high. Switches S5 and S7 are physically coupled to switch S6 to remove power from AM-PM indicator light emitting diode D15 and digital display driver circuit 27 respectively when switch S6 is in the "run" position. This limits the current requirements of the circuit. When switch S6 is in one of the "set time" positions, display driver circuit 27 and light emitting diode D15 are both enabled allowing a user to see what times are being input to the clock. All of the switches are shown in the run position. When switch S6 is in one of the "set time" positions, clock input IN2 is enabled and switches S8 and S9 can be used to rapidly clock the set of hour and minute registers selected by switch S6 until the desired time appears on display 25. Display driver 27 and digital display 25 are interfaced using state-of-the-art techniques.

The integrated-circuit clock, 21, used in this application is manufactured by Fairchild Corporation under part number FCM7001. Syncronizing line frequency, 60/50 Hz, clock pulses are coupled to clock pulse input CP by diode D17. This particular clock has a built in back-up 60/50 Hz oscillator which continues the clocks operation if line frequency is lost. Additional information concerning this clock and circuitry for controlling its mode of operation can be obtained by referring to Fairchild Corporation's specifications for the above part number.

Figure 2:
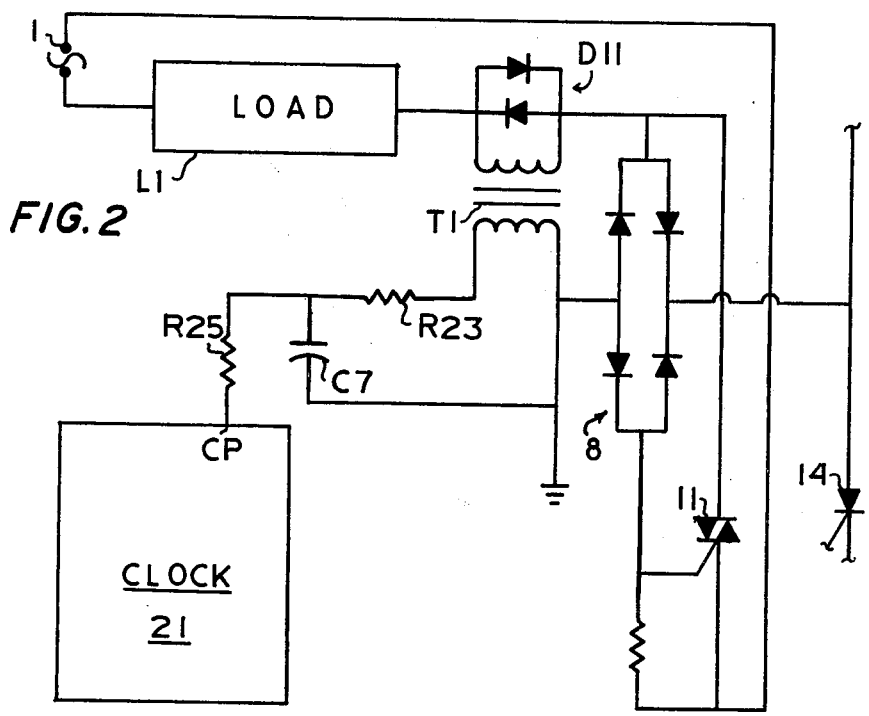
FIG. 2 is a schematic diagram showing the use of a pulse transformer as an alternate means for supplying 60/50 Hz, syncronizing pulses to an integrated circuit clock used in the present invention.

For clocks which do not have the built-in backup oscillator feature, the needed continuous syncronizing clock pulses are supplied by taking advantage of the always present current flow from AC power source 1. When triac 11 is off, this current flow is small and is due to power consumption by the thermostat. On the other hand, the current flow is large when full power is applied to load L1. FIG. 2 shows the circuit which supplies the continuous clock pulse. The primary coil of pulse transformer T1 is connected in series with load L1 and AC power source 1. Back-to-back diodes D11 render the output of transformer T1 essentially unaffected by changes in current flow through the thermostat by limiting the voltage applied to the primary coil to their forward bias voltage. Pulses output from the secondary of transformer T1 are conditioned by resistor R23 and capacitor C7, and coupled to clock pulse input CP of clock 21 by resistor R25.

Referring to FIG. 1, a high or low voltage state of output line 23 applies voltage to voltage divider 18 or 20 respectively. Hence, the selection of the set-point temperature to be maintained is time dependent. The high-state voltage of output line 23 is essentially equal to the supply voltage of clock 21. Voltage present on output line 23 is applied to the base of transistor Q5 which in turn applies voltage to voltage divider 18 because of its emitter follower configuration. In addition, high states of output line 23 turn on transistor Q6 by means of voltage divider 26. When transistor Q6 is on, it pulls the base of transistor Q7 toward ground potential. This turns transistor Q7 off and thereby inhibits the application of voltage to voltage divider 20. Therefore, when output line 23 is high, the set point temperature of voltage divider 18 is maintained by the thermostat. On the other hand, if output line 23 is low, transistors Q5 and Q6 are both turned off. The off state of transistor Q5 removes voltage from voltage divider 18. The off state of transistor Q6 allows the base of transistor Q7 to be pulled to supply voltage potential by resistor R14. This applies voltage to voltage divider 20. Therefore, when output line 23 is low, the set point temperature of voltage divider 20 is maintained.

When full power is applied to load L1, the DC half-waves passing through SCR 14 are representative of rectified alternating current and go to zero when current flow from AC power source 1 passes through zero. Because of this, on states of SCR 14 must be reinitiated with each DC half-wave appearing across the DC terminals of rectifier 8 for continuous application of power to load L1. This occurs with the presence of sufficiently high voltage at junction 16. However, if SCR 22 is turned on, it pulls the voltage at point 16 toward ground potential and, thereby, inhibits the ability of voltage dividers 18 and 20 to initiate on states of SCR 14.

SCR 22 is the means by which the smoke detecting portion of the thermostat prevents the application of full power to load L1. The principal components comprising the smoke detector include: SCR 22, capacitors C1 and C3, photodarlington transistor Q1, transistor Q2, light source L2 and variable resistor R11. Photodarlington Q1 and light source L2 are located in the smoke chamber shown in FIGS. 3 and 4. A small percentage of light from source L2 impinges the base detector of photodarlington Q1. Operating conditions of the circuit are achieved by adjusting variable resistor R11 to "on bias" photodarlington Q1 to a point about half way between "off" and "saturation." Smoke entering the chamber scatters additional light onto the base detector of photodarlington Q1 causing fluctuating increases in current flow through it. The resulting fluctuating voltage at its collector are coupled by capacitor C1 to the base of transistor Q2. Transistor Q2 is "on biased" to maintain a charge on capacitor C3 of insufficient voltage to initiate an on state of SCR 22. The fluctuating voltage is amplified by transistor Q2 and coupled to the gate of SCR 22 by diode D9. Positive swings of the fluctuations will eventually accumulate a charge on capacitor C3 having sufficient voltage to initiate an on state of SCR 22. As stated, an on state of SCR 22 disables operation of the temperature control circuit of the thermostat. Therefore, introducing smoke into the smoke chamber inhibits the application of power to load L1. Once SCR 22 is turned on, it remains on due to current flow from junction 16. It is turned off when current flow from its cathode is discontinued by opening switch S1. Switch S1 functions as a reset switch and is normally closed. If it is left open, SCR 22 is, in effect, removed from the circuit and the ability of the smoke detector to inhibit on states of SCR 14 is disabled.

When smoke is detected by the circuit, an audiable alarm is sounded by supplying a series of voltage pulses to a permanent magnet type speaker. The display output of clock 21 is multiplexed to drive a set of seven segment digital displays. The repetitive high-low voltage states of the display driving lines control the application of voltage pulses to the speaker. Two of digit output driving lines 26 are coupled by diodes D13 to the base of transistor Q8 through resistor R27. One of the terminals of speaker 9 is coupled to power supply line 28 by resistor R29. The other terminal is connected to the collector of transistor Q8. When SCR 22 is off, the emitter of transistor Q8 is isolated from ground potential. In this state, the pulses applied to its base have no effect. This remains the case until SCR 22 is turned on by the smoke detector. The pulses applied to the base of transistor Q8 then cause pulsed power to be applied to speaker 9.

The thermostat includes a current-limiting, voltage-regulating power supply circuit. A regulated voltage is needed so that changes in current flow in different portions of the circuit cannot affect the voltage applied to voltage dividers 18 and 20 which are used for temperature control. Current limiting is needed so that sufficient current cannot flow from source to ground, points 10 and 12 respectively of rectifier 8, to initiate an on state of triac 11 unless SCR 14 is turned on. The current limiter is comprised of: transistor Q3, diodes D10, and resistors R19 and R21. Diodes D10 "on bias" transistor Q3 and apply a voltage across resistor R19. The voltage drop across resistor R19 increases with increasing current flow from the emitter of transistor Q3. This results in a current-limiting effect because an increased voltage drop across resistor R19 tends to reverse bias the emitter of transistor Q3 and cut it off. Zener diode D12 regulates the supply voltage.

Since the AC voltage applied to rectifier 8 and, therefore, the DC half-waves appearing across terminals 10 and 12 go to zero when triac 11 is turned on, a back-up power source for the thermostat is needed. Battery B1 serves this purpose by accumulating a charge during off states of triac 11. In addition, if AC power is lost, battery B1 insures that the smoke detector remains operational.

Figure 3:
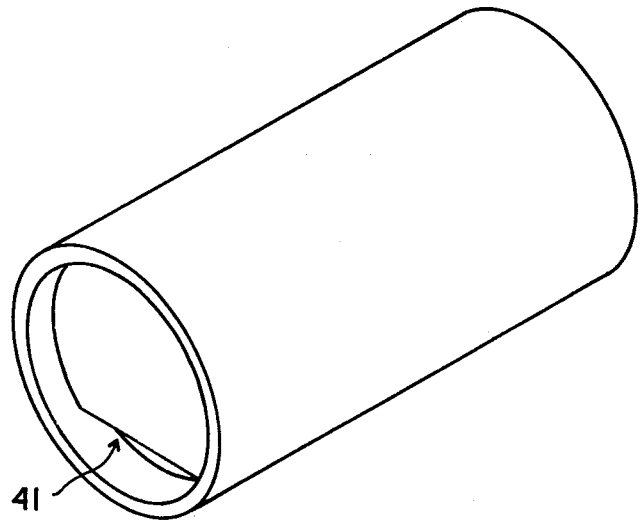
FIG. 3 is a drawing showing a perspective view of a smoke chamber which is an integral part of the present invention.
Figure 4:
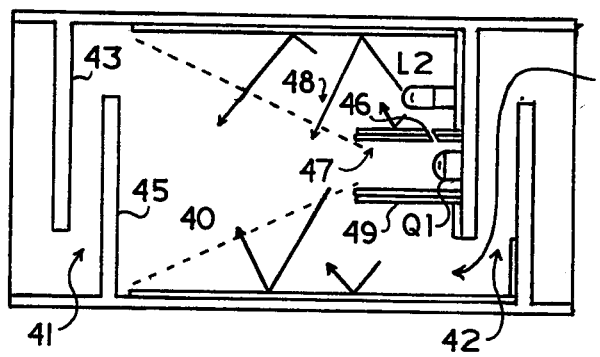
FIG. 4 is a drawing showing a cut-away view of the smoke chamber shown in FIG. 3.

FIG. 4 shows a cut away view of the smoke chamber shown in perspective in FIG. 3. Sets of baffles 41 and 42 block out light rays but allow the passage, as indicated by arrow 44, of smoke in and out of the chamber. The surfaces of the baffles are flat black to reduce the possibility of outside light being reflected into the chamber and affecting its response. Photodarlington transistor Q1 is mounted inside of cylindrical light shield 47. The entire inner surface of the cavity formed by light shield 47 is flat black. Outside surface 49 of the cavity is highly reflective. With the exception of surfaces 43 and 45 located on the baffles at the end of the smoke chamber opposite to photodarlington Q1, all of the remaining inner surfaces are highly reflective. Light is introduced to the chamber by light bulb L2. The location of light bulb L2 facilitates the passage of a small amount of light through the small hole 46 to "on bias" photolarlington Q1. The need for this was discussed earlier. Arrows 48 are intended to illustrate the manner in which light is reflected across the main cavity of the smoke chamber to create a high light flux density in the field of view of photodarlington Q1. Dotted lines 40 indicate the field of view of photodarlington Q1. Since surfaces 43 and 45 and the inside of light shield 47 are flat black, very little light is reflected onto photodarlington Q1. This makes possible a high light flux density inside of the chamber with a controlled effect on the bias state of photodarlington Q1. Smoke entering the chamber scatters additional light toward photodarlington Q1. The resulting fluctuating increases in current flow through photodarlington Q1 cause the ability of the circuit to apply power to load L1 to be inhibited.

What is claimed is:

1. A smoke-detecting, timer-controlled thermostat for controlling the flow of electrical power from a power source to a heat exchanger device used for conditioning the air in an area to be controlled, said thermostat comprising:
   a. a temperature control circuit means connected between said heat exchanger device and power source for controlling the flow of power to said heat exchanger device, said temperature control circuit including at least two temperature responsive means that can be alternatively actuated to selectively control the temperature at which said temperature control circuit means will allow full power to flow to said heat exchanger device and a duty cycle control means for determining the temperature change at which said temperature control means will discontinue the flow of full power to said heat exchanger device and for determining the rate at which on-off cycles of said heat exchanger device occur,
   b. an adjustable timing circuit means connected to said temperature control circuit means actuating during predetermined time periods a selected one of said temperature responsive means employed in said temperature control circuit means, whereby at predetermined times a selected temperature will automatically be maintained in the controlled area and at least two different temperatures can be selected for alternate times,
   c. a smoke detector means connected to said temperature control circuit means for sounding an alarm in response to the presence of smoke and inhibiting the flow of power to said heat exchanger device by disabling said temperature control circuit means,
   d. said timing circuit means further including an output means for supplying a pulsating voltage at an audiable frequency to said smoke detector means, said smoke detector means using said pulsating voltage to produce an alarming sound when smoke is detected.

2. A thermostat as described in claim 1 wherein said thermostat is powered by a small leakage current-flow from said power source through said heat exchanger device during off states of said heat exchanger device, said thermostat including a battery means for supplying operating power to said thermostat when full power is allowed to flow to said heat exchanger device, said thermostat including a power supply circuit means for limiting the current and regulating the voltage upon which said thermostat operates.

3. A thermostat as described in claim 1 wherein said timing circuit means includes a transistor circuit means and an integrated-circuit clock means, said transistor circuit means selectively actuating one of said temperature responsive means in response to signals generated by said integrated circuit clock means.

4. A thermostat as described in claim 1 wherein said duty cycle control means includes a transistor means, a resistive means and a capacitive means, said resistive means and capacitive means determining the rate of change in current flow through the collector of said transistor means during and following on states of said heat exchanger device and thereby determining the duration of on states of said heat exchanger device and determining the time required from the end of an on state of said heat exchanger device for returning said temperature control circuit to the conditions which existed at the beginning of the on state.

5. A thermostat as described in claim 1 wherein said smoke detector means includes a smoke chamber means, a photodarlington transistor means and a light source means for producing fluctuating voltage signals in response to smoke entering said smoke chamber means.

6. A thermostat as described in claim 2 wherein said battery maintains the operation of said smoke detector means if said power source is suddenly disabled, whereby a charge is maintained in said battery by said small leakage current-flow.

* * * * *